United States Patent
Lambey (10) Patent No.: US 10,358,033 B2
(45) Date of Patent: Jul. 23, 2019

(54) HYDRAULIC ASSISTANCE SYSTEM

(71) Applicant: POCLAIN HYDRAULICS INDUSTRIE, Verberie (FR)

(72) Inventor: Julien Claude Lambey, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 15/300,742

(22) PCT Filed: Apr. 1, 2015

(86) PCT No.: PCT/EP2015/057191
§ 371 (c)(1),
(2) Date: Sep. 29, 2016

(87) PCT Pub. No.: WO2015/150462
PCT Pub. Date: Oct. 8, 2015

(65) Prior Publication Data
US 2017/0015197 A1   Jan. 19, 2017

(30) Foreign Application Priority Data

Apr. 2, 2014   (FR) ..................................... 14 52921

(51) Int. Cl.
*B60K 17/356* (2006.01)
*B60K 31/08* (2006.01)
(Continued)

(52) U.S. Cl.
CPC ............ *B60K 31/08* (2013.01); *B60K 17/354* (2013.01); *B60K 17/356* (2013.01);
(Continued)

(58) Field of Classification Search
CPC ... B60K 6/12; B60K 2006/123; B60K 17/356
(Continued)

(56) References Cited

U.S. PATENT DOCUMENTS 3,612,202 A * 10/1971 Moon, Jr. ............... F16H 47/02
  180/14.3
3,656,570 A * 4/1972 Gortnar ................ B60K 17/356
  180/242
(Continued)

FOREIGN PATENT DOCUMENTS

DE   10 2010 053105 A1   6/2012
WO   WO 2014/048841 A2   4/2014

OTHER PUBLICATIONS

International Search Report and Written Opinion in PCT/EP2015/057191 dated May 13, 2015, with English translation. 14 pages.
(Continued)

*Primary Examiner* — Jeffrey J Restifo
(74) *Attorney, Agent, or Firm* — Womble Bond Dickinson (US) LLP (57) ABSTRACT

The invention relates to a vehicle hydraulic assistance method comprising: two hydraulic devices connected therebetween by a supply line, a return line, a power boost source, and a tank, the power boost source being connected to the supply line and return line via a power boost line and taking the oil from the tank; and a vacuum valve including an input port, connected to the supply line and return line, and an output port connected to the tank. The vacuum valve has a first passing state and a second blocking state. The method includes the steps of: (E1) activating the power boost source when the vehicle fulfills at least one predetermined requirement, the vacuum valve being in the first passing state; and (E2) switching the vacuum valve from the first passing state to the second blocking state when hydraulic assistance is required, thus making it possible to boost power to the supply system and return system.

14 Claims, 7 Drawing Sheets

(51) Int. Cl.
  *B60K 23/08* (2006.01)
  *F16H 61/4139* (2010.01)
  *B60K 31/00* (2006.01)
  *B60K 17/354* (2006.01)
  *B60W 10/02* (2006.01)

(52) U.S. Cl.
  CPC ...... *B60K 23/0808* (2013.01); *B60K 31/0058* (2013.01); *B60K 31/0066* (2013.01); *B60W 10/02* (2013.01); *F16H 61/4139* (2013.01); *B60W 2520/10* (2013.01); *B60W 2550/402* (2013.01)

(58) Field of Classification Search
  USPC ........................................ 180/305, 306, 307
  See application file for complete search history.

(56) References Cited

U.S. PATENT DOCUMENTS

| | | | | |
|---|---|---|---|---|
| 3,918,546 | A * | 11/1975 | Chichester | B60K 17/10 180/243 |
| 4,505,355 | A * | 3/1985 | Scheurenberg | B60T 13/22 180/307 |
| 4,528,871 | A * | 7/1985 | Nembach | B60K 17/10 180/242 |
| 4,741,410 | A * | 5/1988 | Tunmore | B60K 6/12 180/165 |
| 4,754,603 | A * | 7/1988 | Rosman | B60K 6/12 60/413 |
| 5,361,208 | A * | 11/1994 | Olson | B60K 17/348 180/243 |
| 6,935,454 | B1 * | 8/2005 | Hauser | B60K 17/10 180/242 |
| 6,991,058 | B2 * | 1/2006 | Cousin | B60K 17/356 180/242 |
| 7,082,757 | B2 * | 8/2006 | Teslak | B60K 6/12 180/165 |
| 7,146,266 | B2 * | 12/2006 | Teslak | B60K 6/12 701/69 |
| 7,146,809 | B1 * | 12/2006 | Hauser | B62D 11/005 60/468 |
| 7,147,078 | B2 * | 12/2006 | Teslak | B60K 6/12 180/305 |
| 7,147,239 | B2 * | 12/2006 | Teslak | B60K 6/12 180/306 |
| 7,213,672 | B2 * | 5/2007 | Rouillard | B60K 28/165 180/305 |
| 7,232,192 | B2 * | 6/2007 | Teslak | B60K 6/12 180/165 |
| 7,913,791 | B2 * | 3/2011 | Rose | B60K 6/12 123/179.31 |
| 7,934,779 | B2 * | 5/2011 | Kodama | B60K 6/44 303/115.3 |
| 8,079,437 | B2 * | 12/2011 | Rosman | B60K 6/12 180/165 |
| 8,302,720 | B2 * | 11/2012 | Rose | B60K 6/12 180/167 |
| 9,346,347 | B2 * | 5/2016 | Gray, Jr. | B60K 6/12 |
| 9,533,663 | B2 * | 1/2017 | Miyazaki | B60T 8/4081 |

OTHER PUBLICATIONS

Search Report in French Application No. 1452921 dated Jan. 19, 2015, with English translation coversheet. 7 pages.

* cited by examiner

HYDRAULIC ASSISTANCE SYSTEM

GENERAL TECHNICAL FIELD

The invention relates to the field of hydraulic assistance circuits used in particular for vehicles. In particular, the invention relates to the optimization of the activation time of hydraulic assistance motors.

PRIOR ART

Hydraulic assistance systems for vehicles are known which can be selectively engaged depending on the operating conditions of the vehicle or on command by a user.

Such systems thus complement a main high-speed vehicle transmission, usually mechanical, electrical or even hydrostatic.

In all of the present text, a hydraulic device is designated as a device capable of operating both as a motor and as a hydraulic pump. A hydraulic device conventionally comprises a plurality of pistons positioned in recesses, in a cylinder block, and carrying out reciprocal movements in contact with a multilobe cam in the case of a hydraulic device with radial pistons.

A particular structure of an assistance system is presented in patent application EP2013/069519 filed on 19 Sep. 2013 on behalf of the applicant.

This structure consists of mounting a first hydraulic device, which is designated as driving, on a shaft of the vehicle driven in rotation by the main transmission of the vehicle, and one or more hydraulic devices, which are designated as driven, on one of the other shafts of the vehicle, not driven by the main transmission, the driving and driven hydraulic devices being connected by a hydraulic circuit. The hydraulic devices each have an intake port and a discharge port. The discharge ports are each connected to an intake port by supply and return lines.

In operating without assistance, the two hydraulic devices are in a free wheel configuration; these are typically hydraulic devices with radial pistons, the pistons not being functional in the free wheel mode.

More precisely, for hydraulic devices with retractable pistons, a free wheel configuration is defined, i.e. a configuration in which the hydraulic device operates without fluid pressure and more particularly where the pistons are not in contact with the associated cam. For hydraulic devices with cylinder block de-coupling, i.e. when the cylinder block is no longer engaged on the shaft, a free wheel configuration is defined in the same manner, in which the shaft do not drives the cylinder block (or conversely).

In both cases, the pistons do not carry out reciprocating movements in contact with the multilobe cam. Such configurations are advantageous, for example, on devices having mixed operating conditions.

The opposite of this free wheel configuration is the operating condition, in which the hydraulic device operates with fluid pressure and the pistons carry out reciprocating movements in contact with the multilobe cam.

Transition from the free wheel configuration to the service configuration is called placement into service of the hydraulic device.

During engagement of the hydraulic assistance, the different hydraulic devices must be put into service. To that end, patent application FR 1351245, filed on 13 Jan. 2013 on behalf of the applicant, presents a booster system comprising in particular a booster source delivering a flow rate adapted to be selectively engaged, said booster source being connected to the supply line and to the discharge line via a booster line. As soon as slippage is observed on a rear axle of the vehicle, the booster source is activated to then deliver a flow rate to the driving hydraulic device, thus allowing the assistance system to be put into service.

However, such a booster system can have a rather extended reaction time (on the order of a second), which corresponds to the time required to raise the supply lines and discharge lines to boost pressure. Moreover, the hydraulic assistance system is generally engaged on demand by the driver, who can activate it in situations which do not necessarily require it.

Coupled with the starting reaction time, it happens that the hydraulic assistance system is activated when that is not necessary, which causes avoidable wear to the system.

PRESENTATION OF THE INVENTION

To correct the foregoing disadvantages, the invention proposes a hydraulic assistance method for a vehicle including:
  two hydraulic devices interconnected by a supply line and a return line,
  a booster source and a reservoir, the booster source being connected to the supply and return lines via a booster line and taking oil from the reservoir,
  a vacuum valve, comprising an input port connected to the supply and return lines, and an output port connected to the reservoir, the vacuum valve having a first, passing, state and a second, blocking, state;
  the method comprising the steps of:
  E1: Activation of the booster source when the vehicle satisfies at least one predetermined condition, the vacuum valve being in the first, passing, state;
  E2: Switching of the vacuum valve from the first, passing, state to the second, blocking, state when hydraulic assistance is required, thus allowing boosting of the supply and return circuits.

Such a method makes it possible to improve the reaction time for putting the system into service and thus limiting the use of hydraulic assistance to necessary cases.

Advantageously, the invention has the following features, taken alone or in combination:
  The method comprises a third step E3: switching of the vacuum valve from the second, blocking, state to the first, passing, state when hydraulic assistance is no longer required, the booster source remaining activated,
  step E2 is always carried out when the booster source is activated,
  The method further comprises a fourth step E4: deactivation of the booster source when the vehicle no longer satisfies one of the predetermined conditions,
  the booster source is an electro-pump unit (GEP) comprising an electric motor and a pump, wherein the activation of the booster source consists of supplying electric power to the electric motor of said unit,
  the vacuum valve is a solenoid valve, controlled electronically by a control unit,
  one of the predetermined conditions is a speed of the vehicle lower than a threshold speed, such as 30 km/h,
  one of the predetermined conditions results from the analysis of the itinerary and/or the trajectory of the vehicle,
  information relative to the predetermined condition resulting from said analysis is provided by a global positioning system, the hydraulic machines are fixed displacement machines, having radial pistons and multilobe cam that can be disengaged, the booster circuit comprises non-return valves and pressure limiters between the booster source and the supply and return lines, a circuit selector is interposed between the supply and return lines and the vacuum valve.

The invention also proposes a hydraulic assistance system including:

two hydraulic devices interconnected by a supply line and a return line, a booster source and a reservoir, the booster source being connected to the supply and return lines via a booster line and taking oil from the reservoir, a vacuum valve, comprising an input port connected to the supply and return lines, and an output port connected to the reservoir, the vacuum valve having a first, passing, state and a second, blocking, state;

characterized in that the hydraulic system includes:

means for detecting a predetermined condition for triggering the activation of the booster source, means of determining the need for hydraulic assistance, means for controlling the states of the vacuum valve;

the valve being put in the first, passing, state by the means for controlling the states of the valve when the detection means detect one of the predetermined conditions, and the valve being put in the second, blocking, state by the means for controlling the states of the valve when the determination means determine a need for hydraulic assistance, thus allowing boosting of the supply and return circuits.

The invention also proposes a vehicle equipped with a hydraulic assistance system previously described and adapted to implement the methods previously described.

PRESENTATION OF THE FIGURES

Other features, goals and advantages of the invention will be revealed by the description that follows, which is purely illustrative and not limiting, and which must be read with reference to the appended drawings, wherein.

DETAILED DESCRIPTION

Figure 1A:
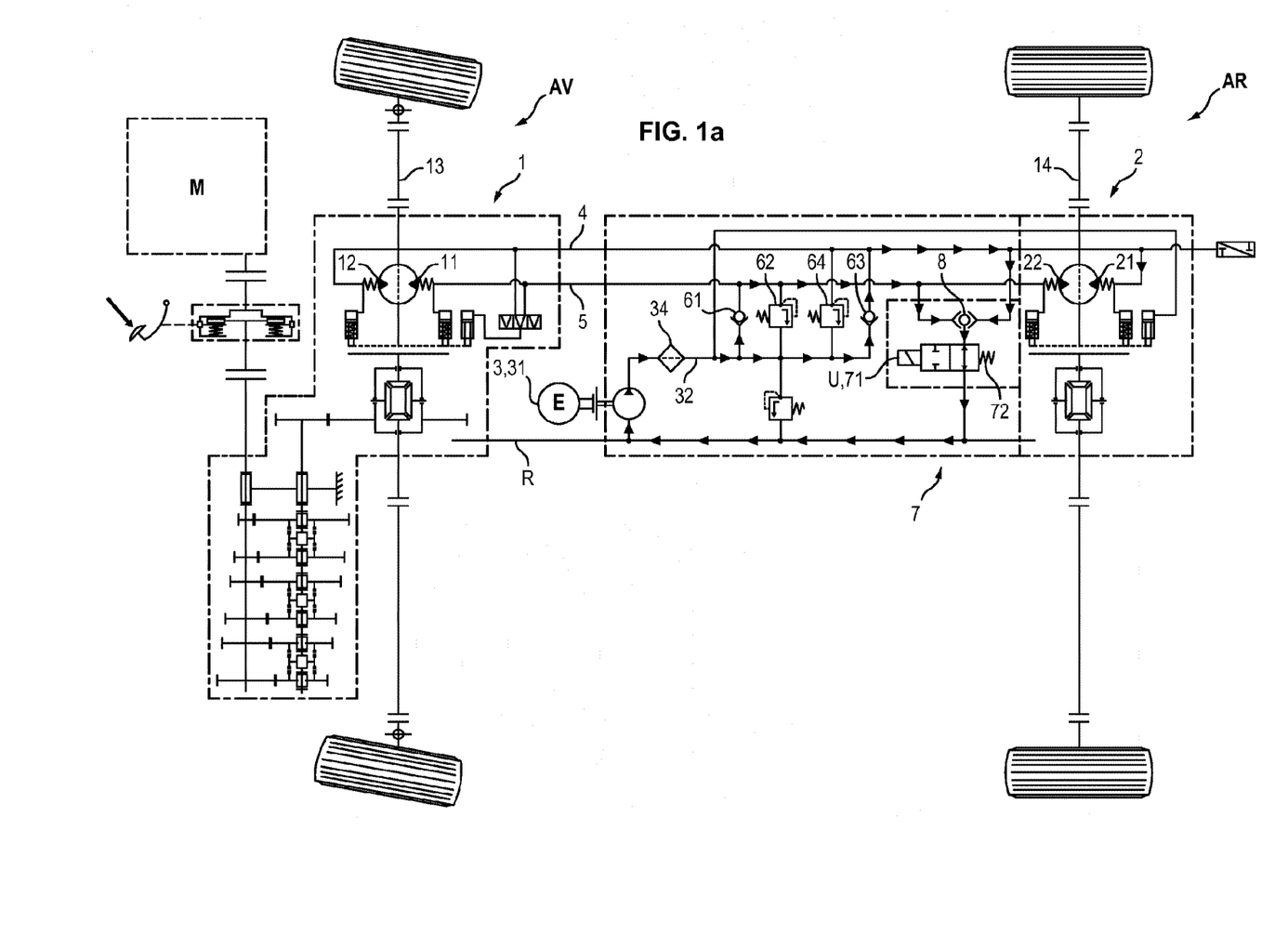
FIGS. 1a and 1b show a hydraulic schematic of a device allowing implementation of the method of the invention at a certain step in the method.
Figure 1B:
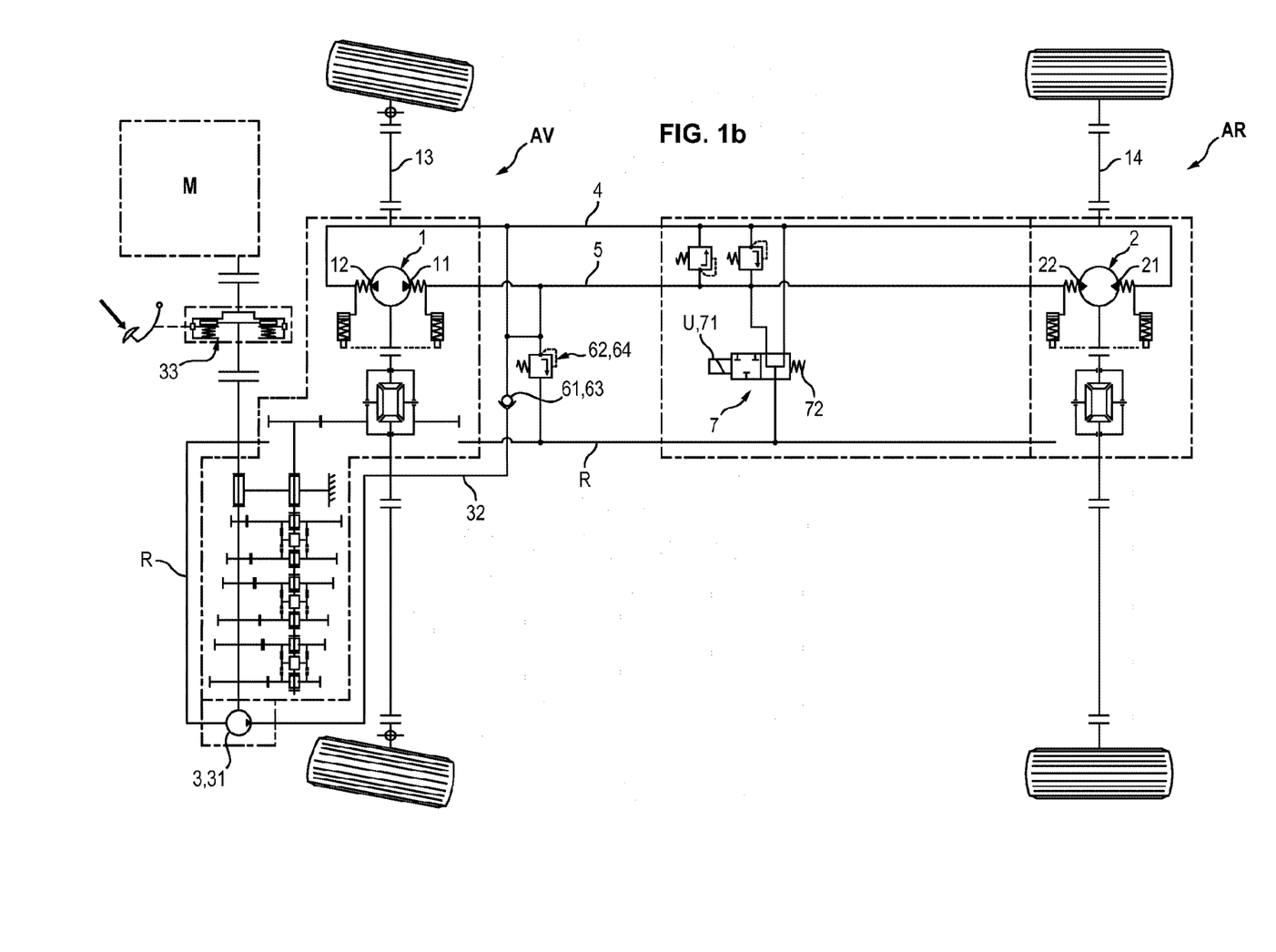

With reference to FIGS. 1a, 1b (from document EP2013/069519) and 2, a schematic of the hydraulic system will be described.

The hydraulic assistance system is mounted on a vehicle V.

The system shown comprises a driving hydraulic device 1, mounted on a front axle AV of the vehicle V and a driven hydraulic device 2, mounted on a rear axle AR of the vehicle V. The hydraulic devices 1, 2 typically have radial pistons, a multilobe cam and are fixed displacement devices, the radial pistons being mounted in a cylinder block. In particular, the multilobe cam can be disengaged, particularly by decoupling the cylinder block and the shaft of the axle.

So as to illustrate the operation of the system, its intake and discharge are labelled for each of these hydraulic devices, respectively intake 11 and discharge 12 of the driving hydraulic device 1, and intake 21 and discharge 22 of the driven hydraulic device 2.

The discharge 12 of the driving hydraulic device 1 is connected to the intake 21 of the driven hydraulic device 2 by a supply line 4, and the discharge 22 of the driven hydraulic device 2 being connected to the intake 11 of the driving hydraulic device 1 by a return line 5.

The hydraulic devices 1 and 2 are each associated with a rotating shaft, respectively 13 and 23, typically a vehicle axle V. For example, the hydraulic devices 1, 2 rotate at the speed of the shaft of the axle, or at the mean speed of the two wheels comprised on the axle (in the case of a differential).

A primary motor M is typically a thermal or electric engine.

Figure 2A:
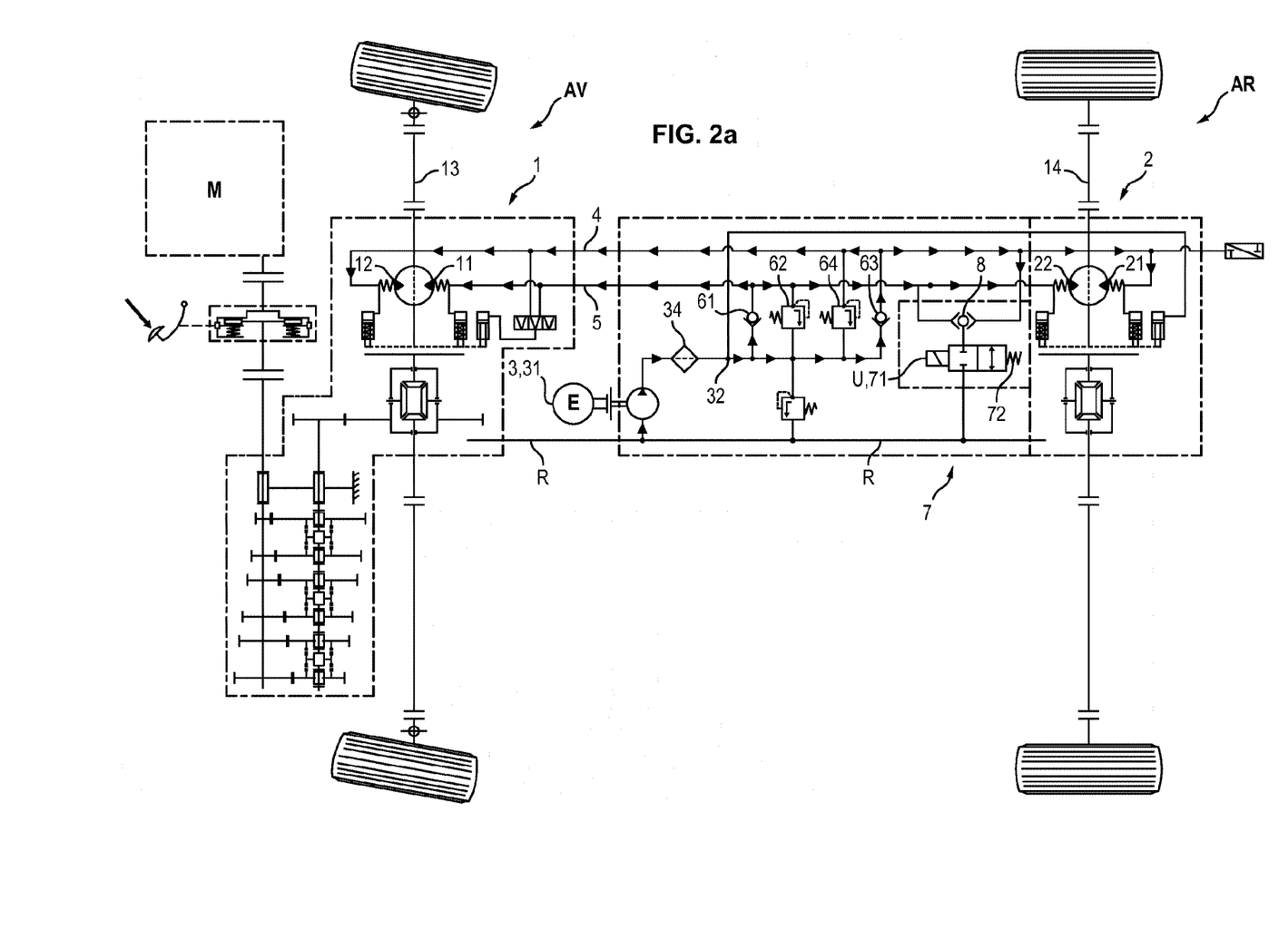
FIGS. 2a and 2b show a hydraulic schematic of a device allowing implementation of the method of the invention at another step in the method.
Figure 2B:
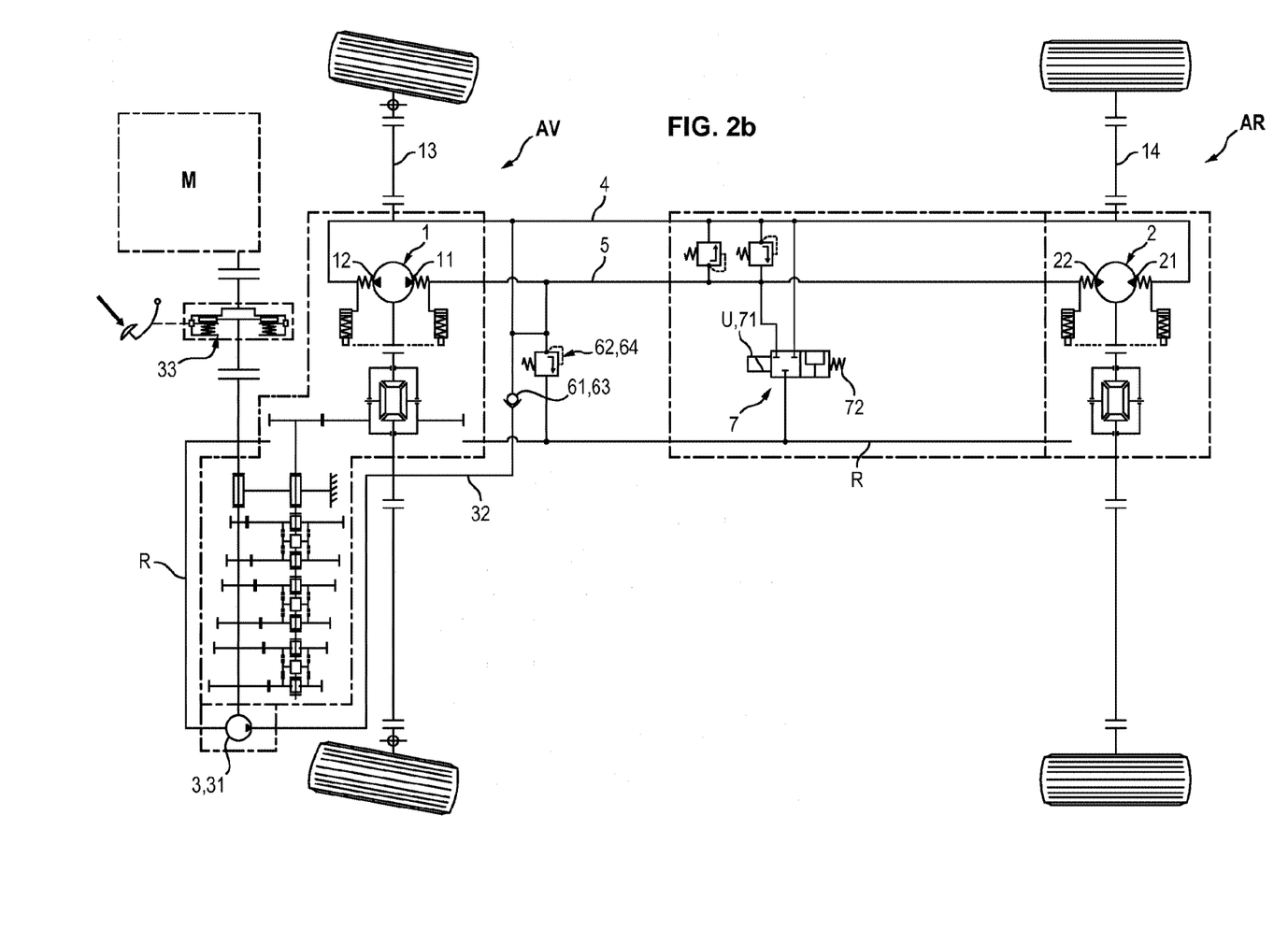

The primary motor M can be coupled to a booster source 3 via a clutch 33, allowing the engagement or disengagement of this booster source 3 with the primary motor M (see FIGS. 1b, 2b).

This primary motor M is for example connected to a main transmission of the vehicle V allowing its wheels to be driven, the different structures of the main transmission and the wheels being well-known to a person skilled in the art and not being shown in the figures.

According to another variant, the primary motor M is an independent motor with respect to the main transmission of the vehicle V or the device considered. The primary motor M and the booster source 3 can then for example form an electro-pump unit (GEP). Typically, the electro-pump unit (GEP) comprises the primary motor M, when this is an electric motor, and a pump.

According to the embodiments shown, the booster source 3 comprises a booster pump 31, and/or a hydraulic accumulator (not shown in the figures), and/or a filter 34 (see FIGS. 1a, 2a).

The booster source 3 takes oil from a reservoir R, typically at ambient pressure. What is meant by reservoir is also the drive lines leading to the reservoir R and which can serve for storing oil.

The booster source 3 is connected to the supply 4 and return 5 lines via a booster line 32.

In particular, the booster line 32 is connected to the return line 5 by a non-return valve 61 in the forward direction (booster source 3 toward the return line 5) and by a pressure limiter 62 in the return direction (return line 5 toward the booster source 3). The booster line 32 is connected to the supply line 4 by a non-return valve 63 in the forward direction and by a pressure limiter 64 in the return direction (see FIGS. 1a, 2a).

The driving 1 and driven 2 hydraulic devices thus form a closed hydraulic circuit, the booster source 3 whereof provides a booster in pressure through the non-return valves 61, 63 and pressure limiters 62, 64 so as to compensate for losses and leaks in the circuit.

A vacuum valve 7 connects the return 5 and supply 4 lines to the reservoir R.

According to a first embodiment (see FIGS. 1a, 2a), the vacuum valve 7 comprises an input port and an output port (two ports, two positions). The return and supply lines are connected to two inputs of a circuit selector 8 (see FIGS. 1a, 2a), the output of the selector being connected to a port of the vacuum valve, the output port of the vacuum valve 7 being connected to the reservoir R. Alternatively, the circuit selector 8 can be replaced by a simple node (see FIGS. 2a, 2b). The line extending from the supply 4 and return 5 lines is then connected to the input port of the vacuum valve 7.

According to a first state, the valve 7 is passing and according to a second state, the valve is blocking.

According to a second embodiment (see FIGS. 2a, 2b), the vacuum valve 7 comprises two input ports and one output port (three ports and two positions). The supply 4 and return 5 lines are each connected to an input port, the output port of the vacuum valve 7 being always connected to the reservoir R.

According to a first state, the valve 7 is passing, i.e. the two input ports communicate with the output port; according to a second state, the valve is blocking.

The vacuum valve 7 is controlled by an actuator 71 which can switch it from the first to the second state. A restoring element 72, such as a spring, holds said valve 7 in the first state by default. The valve 7 is for example a solenoid valve and the actuator 71 is controlled by a control unit U.

Figure 3:
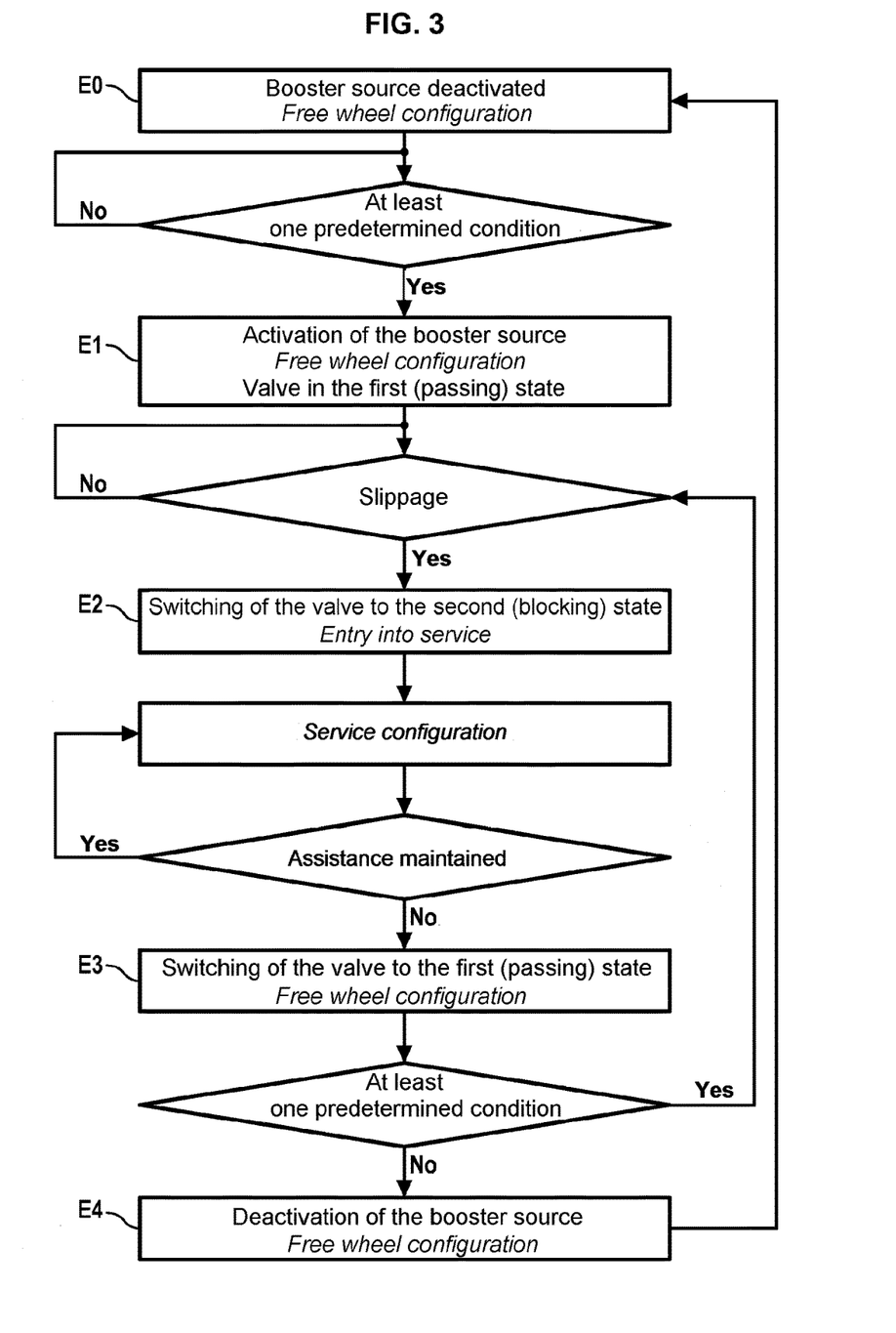
FIG. 3 shows a diagram of a method conforming to the invention.
Figure 4:
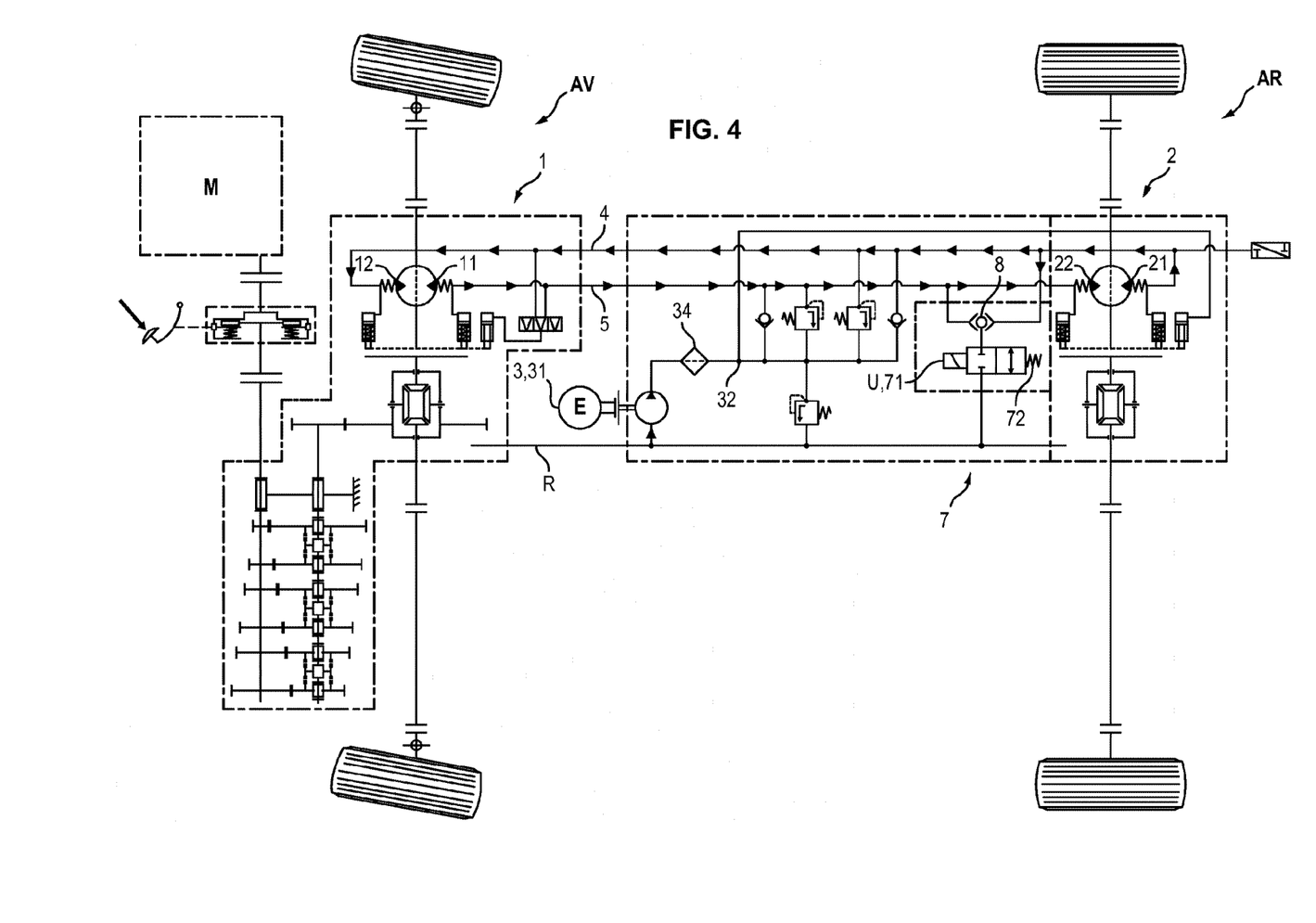
FIG. 4 shows a hydraulic schematic of a device with the hydraulic assistance put into service.

At present, a method for using the booster circuit will be described with reference to FIG. 3.

The hydraulic assistance system is provided to be activated only when the vehicle V verifies at least one predetermined condition. As soon as at least one of the predetermined conditions is satisfied, the vehicle V is said to be in a standby state. For example, this standby state can be defined by speeds of the vehicle V lower than a threshold speed, typically 30 km/h. To that end, the hydraulic system or the vehicle has means for detecting said predetermined conditions.

When the standby state is in effect, the service configuration can be put into service during slippage of the rear axle AR or when a driver of the vehicle V desires it. To be put into service, it is necessary that the supply 4 and return 5 lines are boosted, so that the pressurization of said lines is possible to allow the torque transfer between the driving device 1 and the driven device 2.

The slippage of the rear axle AR can be detected in particular by measuring the speed of the wheels of the vehicle V by means of sensors.

The shaft 13 applies an input torque to the driving hydraulic device 1; the latter being passed in service configuration, it then delivers a flow rate through the intake 21 of the driven hydraulic device 2, which causes its entry into service.

In a first step E1 (see FIGS. 1a, 1b), if the vehicle V is in the standby state, the booster source 3 is activated, bringing oil from the reservoir R into the supply 4 and return 5 lines, and the vacuum valve 7 is in its first state (i.e. passing). Typically, the booster source 3 is the electro-pump unit (GEP).

The vacuum valve 7 is then passing, the oil injected by the booster source 3 into the supply 4 and return 5 lines will return to the reservoir R through the vacuum valve 7 (and/or the circuit selector 8), thus opening the booster circuit of the supply 5 and return 4 lines. The system is therefore still in free wheel configuration.

In a second step E2 (see FIGS. 2a, 2b), if the vehicle V needs hydraulic assistance, i.e. a slippage is observed, the control unit U commands the actuator 71 which causes the switching of valve 7 from the first into the second state (blocking state), thus closing the booster circuit of the supply 4 and return 5 lines. The booster source 3 remains activated. The supply 4 and return 5 circuits are then boosted by the booster source 3 and will allow torque transfer between the driving device 1 and the driven device 2, as was explained previously. Once placement into service is carried out, the hydraulic devices 1, 2 are in service configuration (see FIG. 3): torque taken from the front axle AV is transferred to the rear axle AR.

As soon as hydraulic assistance is no longer demanded, in a third step E3, the actuator 71 puts the valve 7 into its first, i.e. passing, state, and the booster circuit is again open, which causes the pressure in the supply 4 and return 5 lines to drop. The hydraulic system thus transitions into the free wheel configuration.

As long as the vehicle V remains in the standby state, the booster source 3 remains activated. The booster source 3 is thus rotating "unloaded." Finally, in a fourth step E4, if the vehicle V leaves the standby state, i.e. none of the predetermined conditions is satisfied, the booster source 3 is deactivated.

So as to be able to initialize this method, it is possible to provide a preliminary step E0, in which it is verified that none of the predetermined conditions is satisfied and that the booster source 3 is deactivated. In use, step E0 will follow step E4, allowing the method to be repeated.

Thanks to this method, the torque transfer from the driving device 1 to the driven device 2 occurs more rapidly because it is not necessary to wait for the activation time of the booster source 3, nor to wait for the driver to activate hydraulic assistance. In addition, the hydraulic devices 1, 2 are put into service only in a slipping situation of the vehicle V, which makes it possible to reduce the number of cycles carried out by the devices 1, 2 and makes it possible to avoid noise nuisances.

The booster source 3 is dimensioned so that it is always capable of supplying a quantity of oil under a certain pressure, the vacuum valve 7 being capable of causing head losses.

The standby state can also be caused by analyses of the itinerary and/or the trajectory executed by the vehicle V, so as to anticipate a need for hydraulic assistance. In this manner, the predetermined condition can typically take into account the speed of the vehicle V and the characteristics of the trajectory (slope, road, etc.)

For example, it is possible to couple a global positioning system 9, such as a GPS, to the hydraulic assistance system (see FIG. 5) so that said global positioning system 9 supplies information relating to the predetermined condition.

Figure 5:
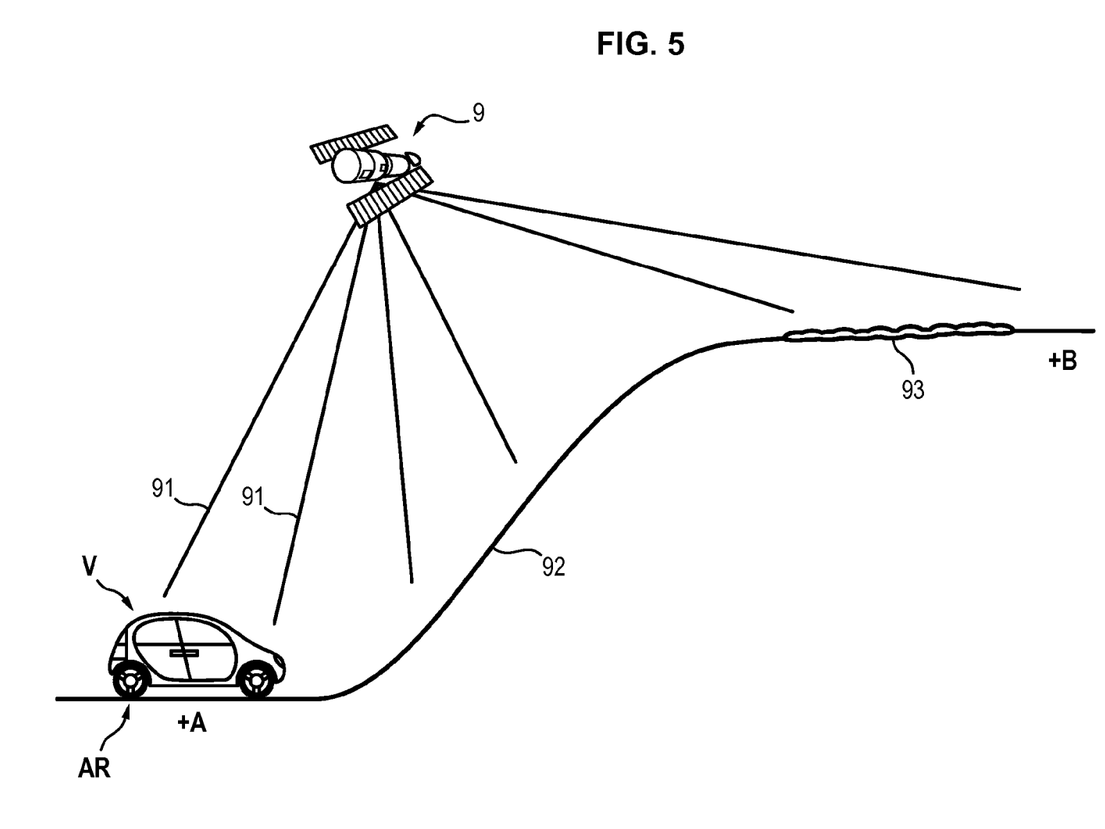
FIG. 5 shows the use of a GPS for using the hydraulic assistance.

The vehicle V needing to travel from a point A to a point B, the global positioning system detects the position 91 of the vehicle V and makes it possible to anticipate the presence of a rise 92 and of ground difficult to travel 93 (obstacles, mud, etc.) which require a torque on the rear axle AR of the vehicle V.

Thus, as soon as the vehicle reaches the beginning of the rise 92 and of the ground 93, a predetermined condition is thus verified, which triggers the standby state of the vehicle V.

The invention claimed is:

1. A hydraulic assistance method for a vehicle including:
two hydraulic devices interconnected by a supply line and a return line,
a booster source that is separate from the two hydraulic devices, and a reservoir, the booster source being connected to the supply and return lines via a booster line and taking oil from the reservoir,
a vacuum valve, comprising an input port connected to the supply and return lines, and an output port connected to the reservoir, the vacuum valve having a first, passing, state and a second, blocking, state;

the method comprising the steps of:
- E1: when the vacuum valve is in the first, passing, state, enabling oil injected by the booster source into the supply and return lines to return to the reservoir and be maintained in said return and supply lines, activating the booster source when the vehicle satisfies at least one predetermined condition;
- E2: after said activating, and hydraulic assistance is required, switching the vacuum valve from the first, passing, state to the second, blocking, state, substantially immediately providing a level of oil pressure necessary for said hydraulic assistance.

2. The method according to claim 1, further comprising a third step E3: switching of the vacuum valve from the second, blocking, state to the first, passing, state when hydraulic assistance is no longer required, the booster source remaining activated.

3. The method according to claim 1, wherein step E2 is always carried out when the booster source is activated.

4. The method according to claim 1, further comprising a fourth step E4: deactivation of the booster source when the vehicle no longer satisfies one of the predetermined conditions.

5. The method according to claim 1, wherein the booster source is an electro-pump unit comprising an electric motor and a pump, and wherein the activation of the booster source consists of supplying electric power to the electric motor of said unit.

6. The method according to claim 1, wherein the vacuum valve is a solenoid valve, controlled electronically by a control unit.

7. The method according to claim 1, wherein one of the predetermined conditions is a speed of the vehicle lower than a threshold speed.

8. The method according to claim 1, wherein one of the predetermined conditions results from the analysis of an itinerary and the trajectory of the vehicle.

9. The method according to the preceding claim, wherein the information relative to the predetermined condition resulting from said analysis is provided by a global positioning system.

10. The method according to claim 1, wherein the hydraulic machines are fixed displacement machines, having radial pistons and multilobe cam that can be disengaged.

11. The method according to claim 1, wherein the booster circuit comprises non-return valves and pressure limiters between the booster source and the supply and return lines.

12. The method according to claim 1, wherein a circuit selector is interposed between the supply and return lines and the vacuum valve.

13. The method according to claim 1, wherein one of the predetermined conditions is a speed of the vehicle lower than 30 km/h.

14. The method according to claim 1, wherein one of the predetermined conditions results from the analysis of an itinerary or the trajectory of the vehicle.

* * * * *